United States Patent [19]

Hopp

[11] 4,003,120
[45] Jan. 18, 1977

[54] CAPTIVE TYPE SPARK PLUG GASKET AND TOOL FOR INSTALLING SAME

[76] Inventor: Harold P. Hopp, 35 Industrial Road, Lodi, N.J. 07644

[22] Filed: July 8, 1975

[21] Appl. No.: 593,985

[52] U.S. Cl. .................................. 29/278; 277/9.5
[51] Int. Cl.² ...................................... B25B 27/14
[58] Field of Search .......... 29/278; 313/118; 277/9, 277/9.5, 236; 151/38; 85/1 JP

[56] References Cited

UNITED STATES PATENTS

| 2,669,148 | 2/1954 | Fack | 81/124.1 |
| 3,099,456 | 7/1963 | Hopp | 277/236 |
| 3,285,632 | 11/1966 | Dunkle | 277/236 |
| 3,299,504 | 1/1967 | Hopp | 277/236 |
| 3,529,837 | 9/1970 | Eaton et al. | 277/235 |

Primary Examiner—James L. Jones, Jr.
Attorney, Agent, or Firm—Charles E. Temko

[57] ABSTRACT

A captive spark plug gasket in which the means for maintaining the captive relation is in the form of an inwardly directed flange, the free edge of which is folded upon itself to provide the equivalent of metal which is appreciably thicker than the original thickness of the metal stock from which the gasket is formed. During a staking operation, the inwardly directed flange is further inwardly folded to reduce the effective diameter of the free edge portion thereof, so as to be positioned to lie upon the unthreaded undercut area adjacent the lower transverse surface of the plug body. Because of the increased thickness of the free edge of the inwardly folded flange, cross threading with respect to the thread on the shank does not occur when the plug is unthreaded from an engaged cylinder head opening, and the gasket remains captive on removal.

5 Claims, 11 Drawing Figures

FIG. 6

CAPTIVE TYPE SPARK PLUG GASKET AND TOOL FOR INSTALLING SAME

Reference is made to my co-pending application, Ser. No. 580,486, filed May 23, 1975, now U.S. Pat. No. 3,948,532, which discloses a related invention and common subject matter.

BACKGROUND OF THE INVENTION

This invention relates generally to the field of spark plug gaskets, and more particularly to an improved captive type which remains in engaged condition upon the threaded shank of a spark plug body during installation and removal. The spark plug gasket art is presently at a highly developed state, and the invention lies in specific constructional details permitting improved reliability with respect to captivity.

It is known in the art to provide gaskets having staked out portions which deform upon installation of the plug within a cylinder head opening to captivate the gasket prior to removal, as illustrated, for example in my prior Pat. No. 3,099,456 granted July 30, 1963. It is also known, as shown in my prior Pat. Nos. 3,156,477 granted Nov. 10, 1964; and 3,299,504 granted June 24, 1967, to provide a staking tool for deforming a locking flange forming part of a gasket to an undercut-engaging position to achieve captivation of the gasket prior to plug installation.

In order to be readily deformed under compression during installation, with adequate metal flow, gaskets of this type are normally formed from relatively thin gauge steel. The locking flange forming part of the gasket is usually of the same thickness as the blank from which the gasket is formed. When a plug has remained in installed condition over a relatively long period of time, rust, grime, and other substances, some of which are the products of combustion, tend to adhere the gasket in position bordering the spark plug opening recess. In such cases, when an attempt is made to remove the plug, the locking projections on the gasket, instead of remaining attached to the plug body, on occasion tend to "cross thread" upon the threaded shank of the plug body, and unthread with rotation of the shank to remain in situ. This condition often remains undiscovered through failure to observe the shank of the plug removed, and when the replacement plug is engaged, it is impossible to properly seal the same because of the presence of the additional unremoved gasket, as a result of which the electrodes of the spark plug are not properly positioned within the cylinder, unfavorably affecting the ignition process.

SUMMARY OF THE INVENTION

Briefly stated, the invention contemplates the provision of a captive type gasket of the class described including a plurality of interconnected compressible flanges which accomplish a sealing function between the plug body and the cylinder head, and an inwardly-extending, generally angularly disposed flange which is stated into position to engage the undercut portion of the threaded shank of the plug body. The free edge of the last mentioned flange is folded upon itself to provide an effective width approximating the medial thickness of the groove on the threaded portion of this shank to resist the tendency of the gasket to cross thread when the plug is removed from the cylinder head, and thereby remain attached to the plug. In one embodiment, the free edge is folded through 180°. In another embodiment, the free edge is folded through approximately 90° relative to the plane of the remaining portion of the inwardly turned flange to provide an equivalent result.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
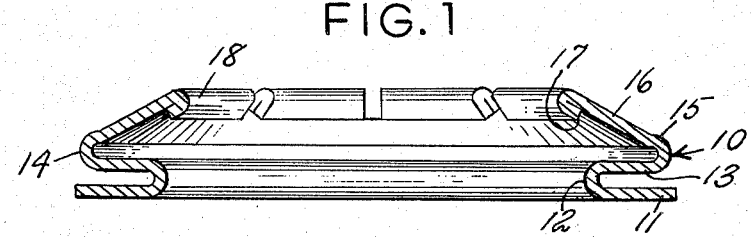
FIG. 1 is a longitudinal central sectional view of a first embodiment of the invention as seen from the plane 1—1 in FIG. 2.
Figure 2:
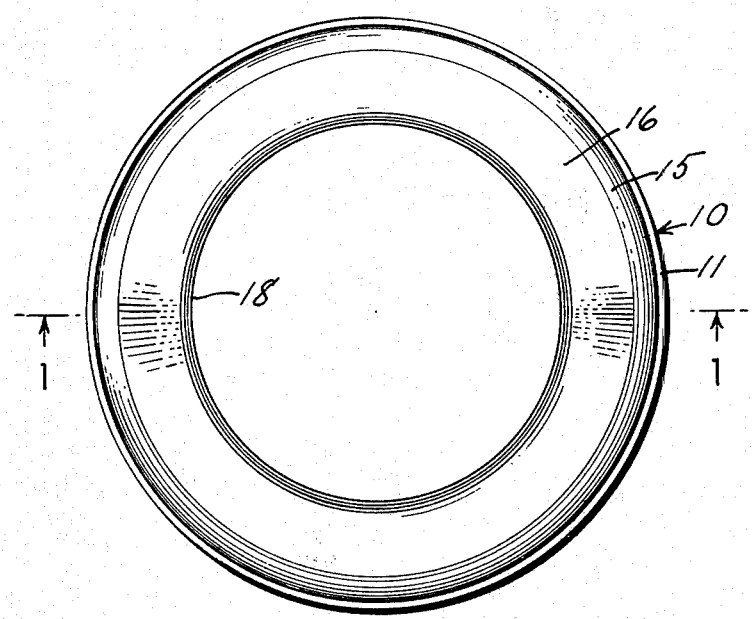
FIG. 2 is a top plan view thereof.
Figure 3:
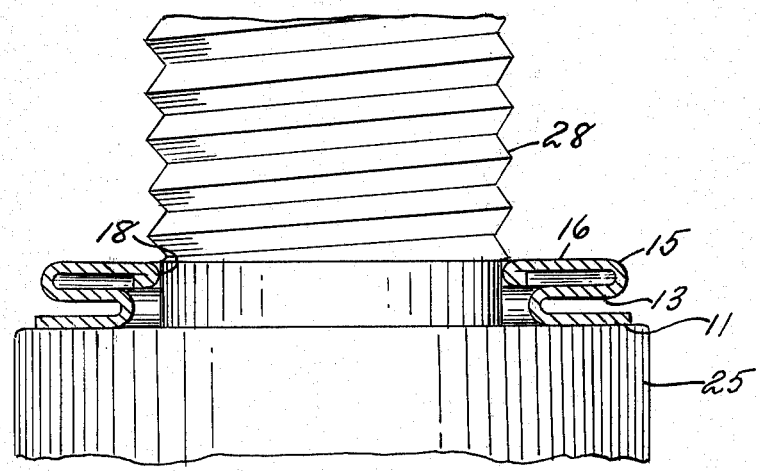
FIG. 3 is a fragmentary sectional view, partly in elevation, showing the first embodiment in installed condition upon a conventional spark plug.

In accordance with the first embodiment of the invention, the device, generally indicated by reference character 10, is illustrated in uncompressed condition in FIGS. 1 through 3, inclusive. The gasket is formed as a multiple-stage stamping operation from thin gauge sheet metal stock, to include a first sealing flange 11 interconnected by a bend portion 12 to a second sealing flange 13, in turn interconnected by a bend portion 14 to a third sealing flange 15. FIGS. 3 through 6, inclusive, illustrate the device after partial compression obtained when the same is staked into captive relation with an associated spark plug.

Extending inwardly from the third flange 15 is an angularly disposed locking flange 16, the free edge 17 of which is folded upon itself to form a thickened edge portion 18, the folding being either in a downward direction, as seen in FIG. 1, or in an opposite direction (not shown). The edge portion 18 may be notched to facilitate subsequent deformation.

Referring to FIG. 3, the device 10 is shown in installed condition upon a conventional spark plug body 25 by longitudinal staking in a manner disclosed in my prior U.S. Pat. No. 3,156,477. In this condition, the flange is inwardly deformed wherein the diameter of the edge portion 18 is approximately that of the diameter of the undercut portion of the threaded shank 28, whereby the device is captivated upon the shank. During subsequent installation of the plug, the flanges 11, 13 and 15 are flattened against each other, but owing to the decreased diameter of the edge portion 18, the thickened areas adjacent edge portion 18 are not compressed and remain of an effective thickness approximating that of the medial thickness of the groove separating adjacent threads on the shank 28. It is the presence of this thickness which prevents any tendency of the edge portion 18 to cross-thread with respect to the shank 28 should the gasket become immobilized with respect to the cylinder head prior to removal of the plug, as when the same is replaced. Thus, the unthreading of the plug with respect to the cylinder head opening ultimately brings the inner end of the thread on the shank to bear upon the locking flange 16, and force it to remain in captivated position.

Figure 4:
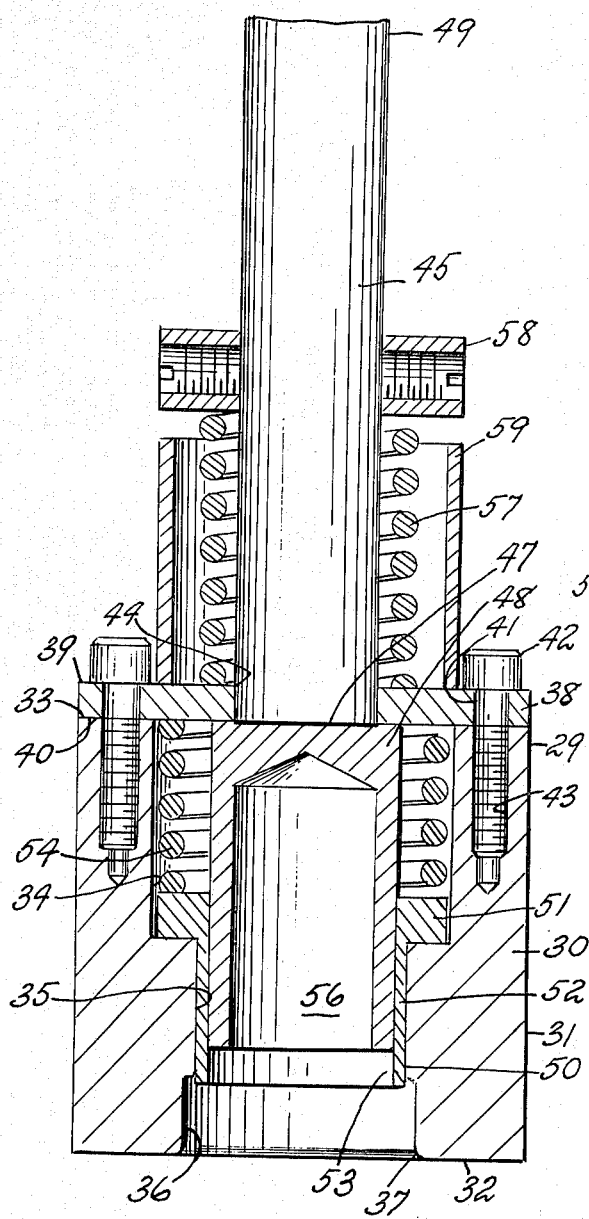
FIG. 4 is a longitudinal central sectional view of a staking tool suitable for installing the gasket structure of FIGS. 1 to 3 inclusive upon a spark plug.

As has been mentioned, it is possible to install the first embodiment of the invention using a conventional cylindrical staking tool. However, when a large number of gaskets are installed as an in line operation, it is preferable to provide an installation tool which will automatically center the gasket relative to the plug body before the staking step takes place, thereby assuring that the gasket will be captured on the plug. FIG. 4 illustrates an improved tool suitable for such in line operation.

The staking tool, generally indicated by reference character 29, includes a main cylindrical body 30 bounded by an outer surface 31, a lower end surface 32 and an upper end surface 33.

Concentrically disposed with respect to the principal longitudinal axis of the body 30 are an upper bore 34, a medially disposed bore 35 and a lower counterbore 36, the lower end edge 37 of which is preferably chambered to provide a camming function. A top wall member 38 partially overlies the bore 34, and is bounded by an upper surface 39 and a lower surface 40. A plurality of bores 41 accommodate bolts 42 engaging threaded bores 43 in the body 30 to maintain the top wall member 38 in position. A centrally disposed opening 44 slideably accommodates an elongated shaft 45, the lower end 47 thereof accommodating a cylindrically shaped staking member 48. The upper end 49 communicates with a source of reciprocating motion, such as a hydraulic cylinder (not shown).

Sideably supported in the medially disposed bore 35 is an ejecting member 50, including an upper annular member 51 positioned within the upper bore 35, and a lower cylindrical member 52 positioned in the bore 35. The ejecting member 50 has a centrally disposed bore 53 slidably accommodating the staking member 48. A spring 54 is positioned with the bore 34, the upper end of which presses against the lower surface 40 of the top wall member 38, and the lower end of which presses against the upper surface of the annular member 51 to urge the ejecting member 50 to the position shown in FIG. 4.

Figure 6:
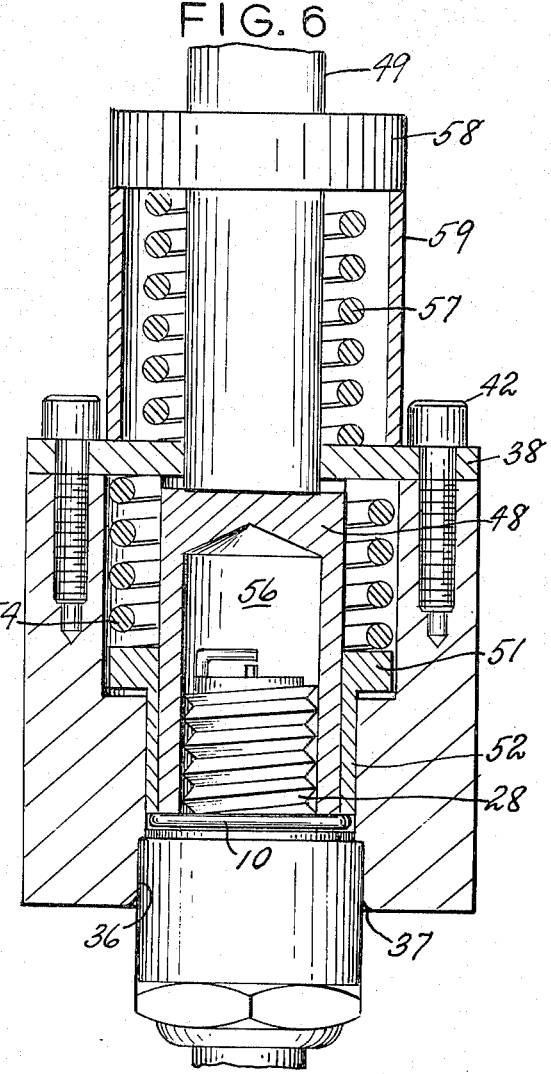
FIG. 6 is a similar fragmentary sectional view showing a second and final step in the installation of a gasket.

The staking member 48 includes a centrally disposed longitudinal bore 56 accommodating the threaded shank of the plug body 25. A spring 57 includes a lower portion contacting the upper surface 39 of the wall member 38, and an upper end which bears against a collar 58 surrounding the shaft 45 tending to position the staking member 48 in the position shown in FIG. 4. An annular sleeve 59 limits the degree of downward movement of the staking member 48 with respect to the body 30 through the contact of the upper edge thereof with the collar 58, as best seen in FIG. 6.

Figure 5:
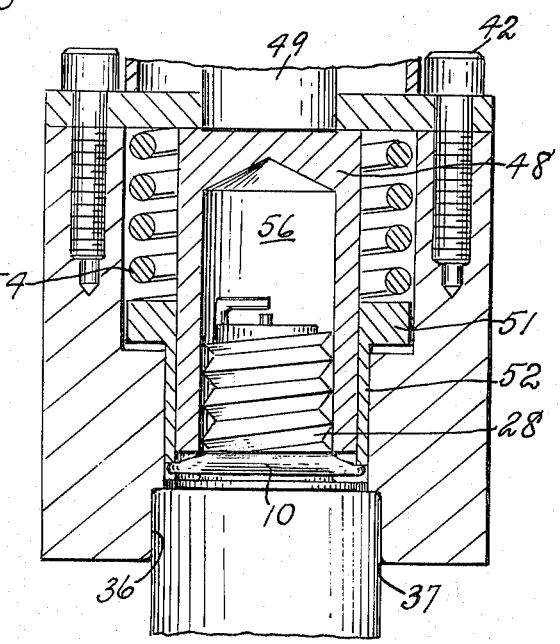
FIG. 5 is a similar fragmentary sectional view corresponding to the lower portion of FIG. 4 and showing a first step in the installation of a gasket.

FIG. 5 illustrates a first step in the installation of a gasket 10 upon the plug body 25. Assuming the gasket has been positioned upon an upwardly turned plug, the lowering of the body 30 causes engagement of the bore 36 with the outer surface of the plug body, thereby assuring centering of the threaded shank with respect to the tool 29. As the tool descends, contact with the bore centers the gasket, and the lower edge of the ejecting member 50 rests thereupon. During this stage, the springs 54 and 57 assure that the ejecting member 50 contacts the gasket in advance of the staking member 48.

With continued downward movement, the ejecting member 50 moves upwardly against the action of the spring 54. The lower circular edge of the staking member 48 subsequently comes to bear upon the locking flange of the gasket, and the same is deformed inwardly to approximately parallel relation with respect to the sealing flanges thereof. Upon removal of the tool, the gasket assumes the condition best seen in FIG. 3. In this condition, the locking flange is located at the end of the threaded portion of the shank, and the sealing flanges are relatively uncompressed prior to installation of the plug within a cylinder head.

Figure 10:
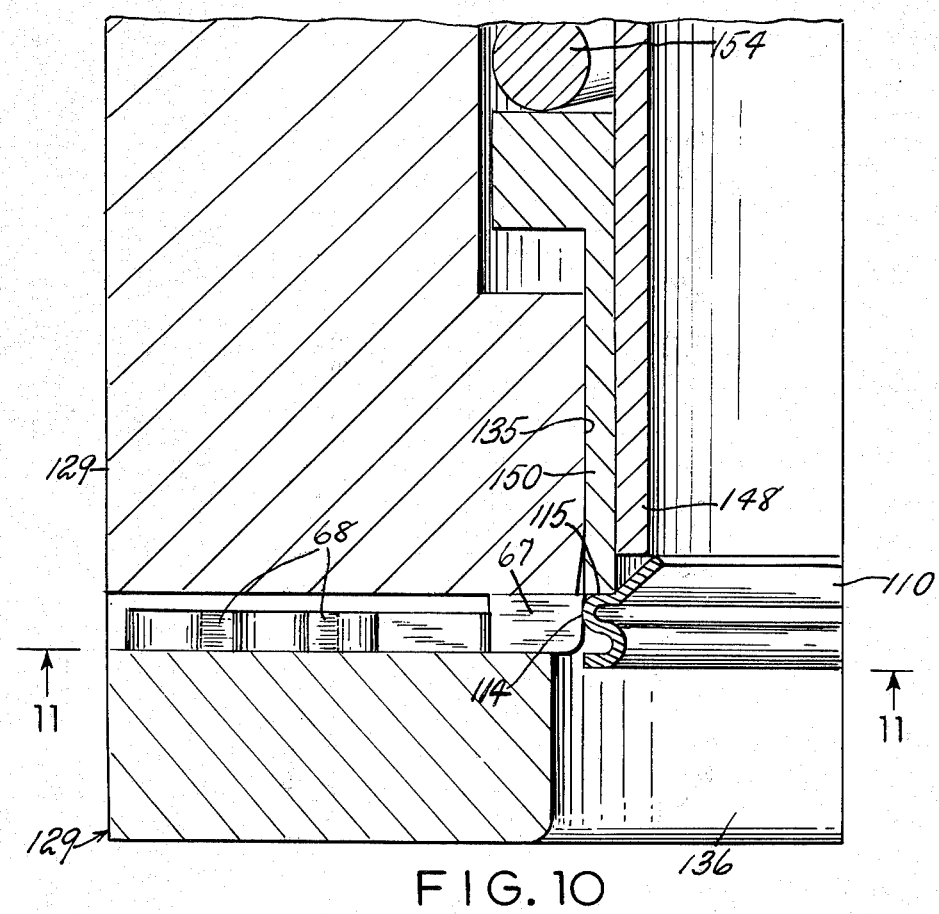
FIG. 10 is an enlarged fragmentary sectional view corresponding to the lower left hand portion of FIG. 6, but showing a modified form of staking tool.
Figure 11:
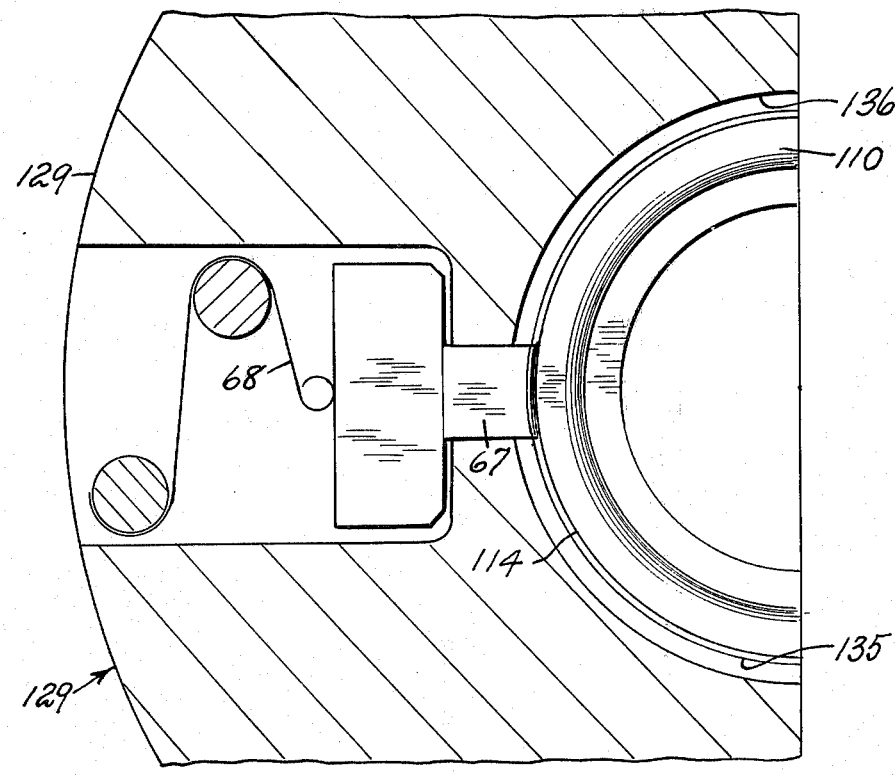
FIG. 11 is a fragmentary transverse offset sectional view as seen from the plane 11—11 in FIG. 10.

FIGS. 10 and 11 illustrate a modification of the tool 29, in which, to avoid needless repetition, parts corresponding to those of the unmodified form have been designated by similar reference characters with the additional prefix (1).

The modification shown in FIGS. 10 and 11 differs from the unmodified form in the slight enlargement of the diameter of the lower bore 135, and the incorporation of spring-pressed contact members 67 capable of inward movement to the original diameter. This modification is particularly suited for those configurations of gasket which exhibit a slight enlargement in total diameter upon installation upon the plug body and where greater manufacturing tolerances are observed. Rather than becoming jammed against the surface of the bore 135, the gasket is retained by the resilient members 67 against the action of a hairspring 68, so that they are readily dislodged by the ejector member 150 with upward movement of the tool 129.

Figure 7:
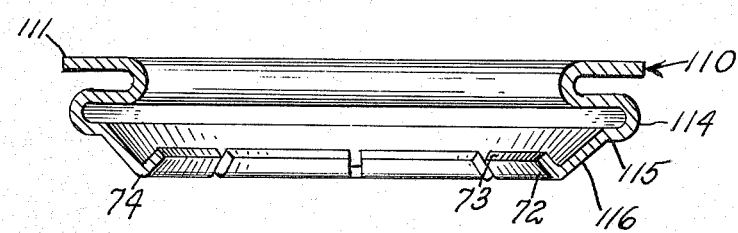
FIG. 7 is a longitudinal central sectional view of a second embodiment of the invention.
Figure 8:
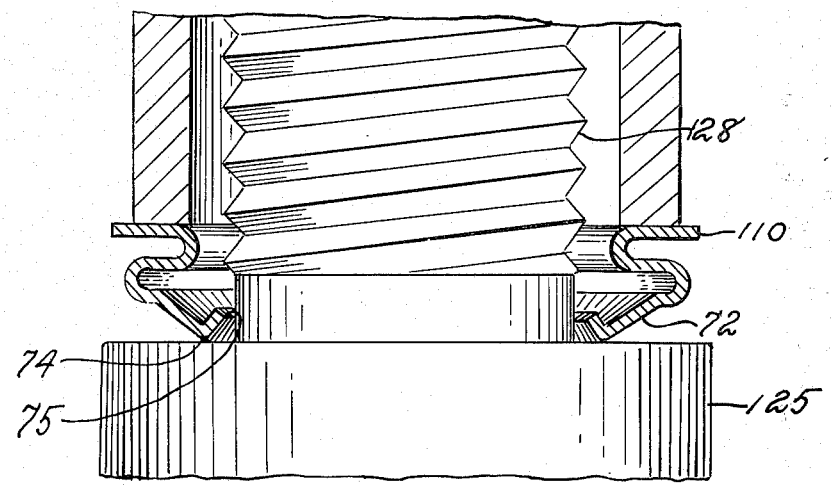
FIG. 8 is a similar fragmentary sectional view, partly in elevation, showing a first step in the installation of the second embodiment upon a spark plug.
Figure 9:
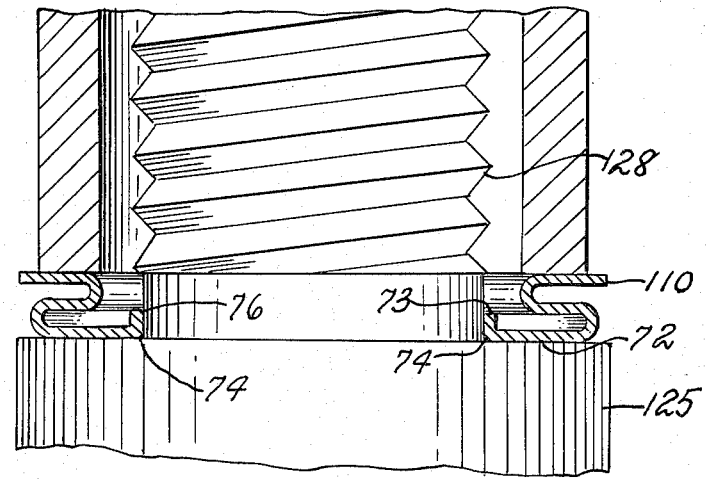
FIG. 9 is a similar sectional view, partly in elevation, showing the completion of the installation of the second embodiment.

Turning now to the embodiment of the invention illustrated in FIGS. 7 to 9, inclusive, parts corresponding to those of the embodiment shown in FIGS. 1 to 3, inclusive, have been designated by similar reference characters with the additional prefix 1.

The embodiment 110 differs from the embodiment 10 in two important aspects. Firstly, it is adapted to be installed with the locking flange abutting the lower transversely extending surface of the plug body rather than the staking tool.

Secondly, the embodiment 110 provides an angularly disposed locking flange 72 formed by folding the free edge 73 through approximately 90°, rather than 180° to form a fold edge 74, the distance between the parallel edges 73 and 74 again being at least equal to the medial width of a groove disposed between adjacent threads on the threaded shank. After installation, which may be accomplished using a conventional staking tool, the fold area lies parallel to the principal axis of the spark plug.

I wish it to be understood that I do not consider the invention limited to the precise details of structure shown and set forth in this specification, for obvious modifications will occur to those skilled in the art to which the invention pertains.

I claim:

1. In a combination spark plus and captive gasket therefor, in which said spark plug includes a plug body having a threaded shank extending outwardly along the principal axis of said plug from a main body, said threaded outer shank including an undercut area adjacent said main body, said gasket including a plurality of mutually compressible flanges and a locking flange lying in a curved plane and extending inwardly of said compressible flanges to be engaged within said undercut area, said locking flange having a free and generally arcuate edge, said threaded shank having a given pitch and defining a continual spiral recess between adjacent convolutions of said thread, the improvement comprising: said arcuate free edge of said locking flange being bent out of said curved plane, whereby the effective thickness of said edge is substantially greater than the thickness of metal forming said locking flange; said locking flange upon being compressed during installation of said plug and gasket with a threaded spark plug opening being deformed to lie in a plane perpendicular to said principal longitudinal axis of said spark plug wherein the bent portion of said arcuate free edge is reduced in diameter to substantially correspond to the diameter of said undercut area, said bent portion being substantially continuous and lying at least partially in a curved plane intersecting the plane of said locking flange, the effective thickness of said bent portion providing sufficient rigidity to said locking flange to prevent cross-threading thereof with said spiral recess upon the disengagement of said plug from said threaded opening.

2. Structure in accordance with claim 1, further characterized in said free edge being bent from the curved plane of said locking flange over the entire arcuate length thereof.

3. Structure in accordance with claim 2, in which said free edge is bent through substantially 90°.

4. Structure in accordance with claim 3, in which said free edge is folded through substantially 180°.

5. Structure in accordance with claim 1, in combination with a tool for installing said gasket upon said spark plug, tool including a main body element defining a first bore of diameter corresponding to that of said spark plug body, and forming a shoulder for limiting ingress of said plug body therein, said main body element having a concentric counterbore of diameter corresponding approximately to the outer diameter of said compressible flanges of said gasket; an ejecting member slideably disposed in said counterbore and having an annular edge adapted to bear upon said gasket adjacent an outer edge thereof, said ejecting member in contacting said gasket clearing said locking flange, said ejecting member having an axially disposed bore therein; and a cylindrically-shaped staking member slideably disposed within said bore in said ejecting member and having a centrally disposed bore of diameter adapted to clear said threaded shank of said plug body, and an angular edge adapted to contact and deform said locking flange to planar condition substantially parallel to a principal plane of said gasket.

* * * * *